United States Patent [19]

Misuraca

[11] Patent Number: 5,493,907
[45] Date of Patent: Feb. 27, 1996

[54] SELF-CLEANING SIGHT TUBE ASSEMBLY

[75] Inventor: Alfonso M. Misuraca, Somerset, N.J.

[73] Assignee: Excell Design & Construction Services, Inc., Somerset, N.J.

[21] Appl. No.: 356,914

[22] Filed: Dec. 15, 1994

[51] Int. Cl.⁶ .................................................. G01F 23/02
[52] U.S. Cl. ................................................ 73/324; 73/323
[58] Field of Search ........................... 73/323, 324, 325, 73/326; 15/104.05, 104.07, 246

[56] References Cited

U.S. PATENT DOCUMENTS

| | | | |
|---|---|---|---|
| D. 122,039 | 8/1940 | Van Gaasbeek | 73/324 |
| 362,719 | 5/1887 | Campbell | 73/319 |
| 858,663 | 7/1907 | Liebscher | 73/324 |
| 1,276,831 | 8/1918 | Tillery | 73/324 |
| 2,765,660 | 10/1956 | De Hart | 73/324 |
| 3,393,564 | 7/1968 | Simmons | 73/324 |
| 3,402,418 | 9/1968 | Le Roy | 15/250.01 |
| 4,549,567 | 10/1985 | Horton | 73/863.45 |
| 5,103,757 | 4/1992 | Palazzolo | 73/861.75 |

FOREIGN PATENT DOCUMENTS 701398  1/1965  Canada.

*Primary Examiner*—Richard Chilcot
*Assistant Examiner*—Max Noori
*Attorney, Agent, or Firm*—David L. Davis

[57] ABSTRACT

A self-cleaning assembly for a vertically oriented sight tube interposed in a flow line is suspended from a bearing member for free rotation within the sight tube. The assembly includes a support member having a pair of cleaning members suspended remote from the tube axis. A flow directing assembly upstream from the sight tube (either above or below) sets up a spiral flow pattern within the sight tube. This spiral flow pattern causes the cleaning assembly to spin, and centrifugal force pushes the cleaning members against the interior wall of the sight tube to effect a scouring action thereon.

19 Claims, 2 Drawing Sheets

SELF-CLEANING SIGHT TUBE ASSEMBLY

BACKGROUND OF THE INVENTION

This invention relates to fluid flow lines having a sight tube interposed therein and, more particularly, to a self-cleaning assembly for such a sight tube.

There are numerous applications wherein fluid flow lines have a transparent section so that the flow is visible therethrough, such visibility often being desirable to provide a quick check of the operative status of a system. In a system where the flowing fluid comprises suspended particulate matter, particles often adhere to and accumulate on the interior wall of the flow line. This is undesirable because it reduces visibility through the transparent section of the flow line. It is therefore an object of the present invention to provide an assembly for scouring the interior wall of the transparent section of a fluid flow line to remove particles that have accumulated thereon.

Such an assembly preferably should not require an external power source and should use only the power which is available from the fluid flow. It should not damage the sight tube and not become fouled by particles in the fluid stream. Further, the assembly should present minimal restriction to fluid flow.

It is therefore a more specific object of this invention to provide such an assembly which is operative in response to fluid flow so that no external activation or energization of the assembly is required in order to effect the cleaning function.

It is another object of this invention to provide such an assembly which is self cleaning so that it does not become fouled by particles in the fluid stream and which presents minimal restriction to fluid flow.

SUMMARY OF THE INVENTION

The foregoing and additional objects are attained in accordance with the principles of this invention by providing an assembly for scouring the interior wall of a vertically oriented cylindrical tube interposed in a fluid flow line. The assembly comprises a scouring member supported within the tube for rotation about the central axis of the tube, the scouring member being vertically suspended from an upper portion thereof. The assembly also comprises means responsive to fluid flow in the line for rotating (spinning) the scouring member about the central axis of the tube so that centrifugal force causes the scouring member to be moved outwardly into scouring engagement with the interior wall of the tube.

In accordance with an aspect of this invention, the assembly further includes a generally planar circular disc, means for supporting the disc in a generally horizontal plane for rotation about the central axis of the tube, and means for securing the scouring member to the disc remote from the central axis of the tube.

In accordance with another aspect of this invention, the disc is supported at its center and there are a plurality of scouring members each secured at the periphery of the disc at equiangularly spaced locations thereon.

In accordance with a further aspect of this invention, the means for rotating the scouring member includes flow directing means for causing the fluid to flow in a spiral pattern within the tube.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
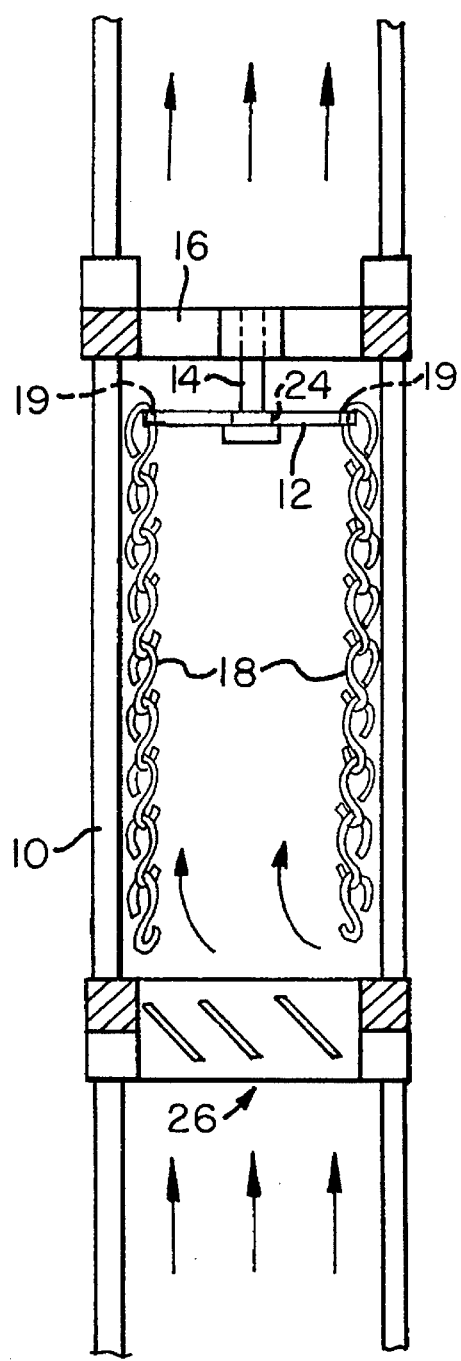
FIG. 1 schematically depicts a first embodiment of a self-cleaning assembly according to this invention installed within a transparent section of a fluid flow line.

Referring now to the drawings, FIG. 1 illustrates a fluid flow line having a transparent section 10 utilized as a sight tube for visually checking the flow in the line. According to the present invention, the transparent section 10 is cylindrical and it is disposed with its major (central) axis in a generally vertical orientation. A cleaning assembly with hanging cleaning members is suspended within the transparent section 10 and fluid flow through the section 10 is directed into a spiral pattern, which causes the cleaning assembly to spin. Centrifugal force then causes the hanging cleaning members to move outwardly against the interior of the section 10 to effect a scouring action thereon.

The cleaning assembly according to this invention includes a support member 12 which, in a first embodiment, comprises an elongated bar. The bar 12 has a length less than the diameter of the sight tube 10 and is supported at its center by the shaft 14 for rotation about an axis coaxial with the central axis of the sight tube 10. At its upper end, the shaft 14 is held by a member 16 which is secured in the flow line in a suitable manner and which allows fluid to flow therethrough. Thus, for example, the member 16 may either have apertures therethrough or may be formed with spokes radiating from a central hub which holds the shaft 14.

Suspended from the ends of the bar 12 are a pair of cleaning members 18. It has been found that a length of stainless steel chain functions well as the cleaning members 18, but other forms of cleaning member may be utilized, bearing in mind that the cleaning members should not be lighter than the fluid (so that they do not float upwardly) and should be heavy enough so that they remain suspended even when viscous fluid is flowing upwardly. When lengths of chain are utilized as the cleaning members 18, they are illustratively secured to the bar 12 by providing throughholes 19 at the ends of the bar 12 and placing the upper link of each of the cleaning members 18 through a respective through-hole.

Figure 2:
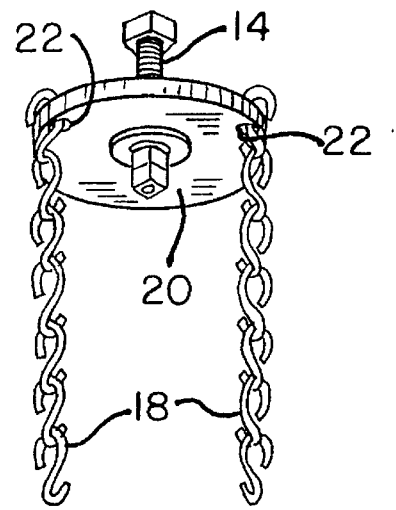
FIG. 2 is a perspective view of a second embodiment of a portion of the self-cleaning assembly according to this invention.

FIG. 2 illustrates an alternate embodiment to replace the bar 12 as the support member. As illustrated, a generally planar circular disc 20 having a diameter less than the diameter of the sight tube 10 is supported at its center on the shaft 14 in a generally horizontal plane for rotation within that plane. The cleaning members 18 are secured to the disc 20 by extending through through-holes 22 therethrough.

While two cleaning members 18 have been shown, it is understood that the present invention is not limited to that number of cleaning members. It is preferable that the support member, whether it be the bar 12 or the disc 20, be balanced about its axis of rotation. Therefore, in the case of the bar 12, two cleaning members 18 should be utilized. In the case of the disc 20, it is preferable that there be at least two cleaning members 18, which are equidistant from the center of the disc 20 and equiangularly spaced thereabout.

As illustrated, the support member (the bar 12 or the disc 20) is supported on a bearing 24 at the end of the shaft 14 and the shaft 14 is fixedly secured to the member 16. Alternatively, the support member could be fixedly secured to the shaft 14 which would then be coupled to the member 16 through a bearing. What is critical is that the bar 12 or the disc 20 is free to rotate with minimal frictional resistance.

Rotation of the support member 12, 20 and the cleaning members 18 is effected by causing fluid to flow through the sight tube 10 in a spiral pattern so that its velocity has a tangential component. This tangential component of fluid flow acts upon the cleaning members 18 to cause them, along with the support member 12, 20, to spin about the central axis of the sight tube 10. This spinning results in a centrifugal force acting on the cleaning members 18 which pushes them in a radially outward direction against the interior surface of the sight tube 10 to effect a scouring action thereon.

Figure 3A:
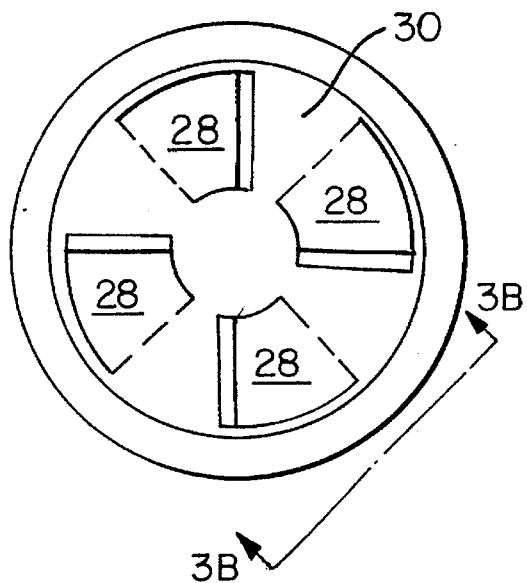
FIG. 3 is a plan view of a first embodiment of the flow directing means of the assembly according to this invention and FIG. 3B is a partial side view taken along the line 3B—3B in FIG. 3A.
Figure 3B:
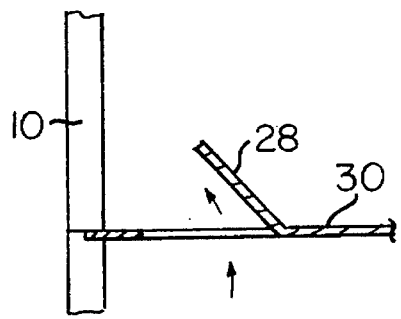

To create the spiral pattern of fluid flow through the sight tube 10, there is provided a flow director 26 (FIG. 1) upstream of the sight tube 10 which changes the axial flow pattern through the flow line into a spiral flow pattern through the sight tube 10. In a first embodiment shown in FIGS. 3A and 3B, the flow director comprises a plurality of radial vanes 28 at approximately a 45° angle to the central axis of the sight tube 10. Illustratively, the vanes 28 are formed by making appropriate radial and concentric circular slits in a thin planar disc 30 and bending the vanes 28 out of the plane of the disc 30 to a desired angle. The angle of the vanes 28 can be varied to control the force with which the cleaning members 18 scrape against the interior surface of the tube 10.

Figure 4A:
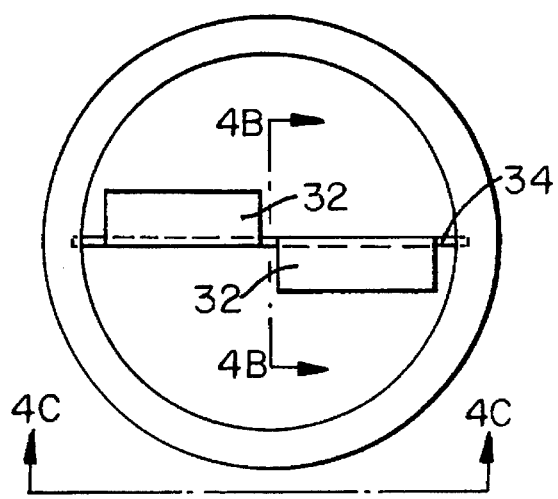
FIG. 4A is a plan view of a second embodiment of the flow directing means of the assembly according to this invention and FIGS. 4B and 4C are side views taken along the lines 4B—4B and 4C—4C, respectively, in FIG. 4A.
Figure 4C:
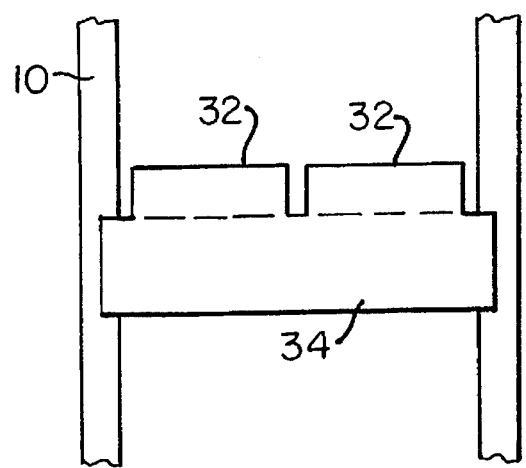
Figure 4B:
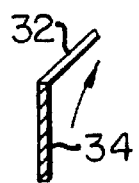

In a second embodiment shown in FIGS. 4A, 4B and 4C, the flow director comprises a pair of vanes 32 formed from a thin verticaly oriented plate 34. The vanes 32 are bent in opposite directions to a desired angle, which angle can be varied to control the force with which the cleaning members 18 scrape against the interior surface of the tube 10.

Figure 5:
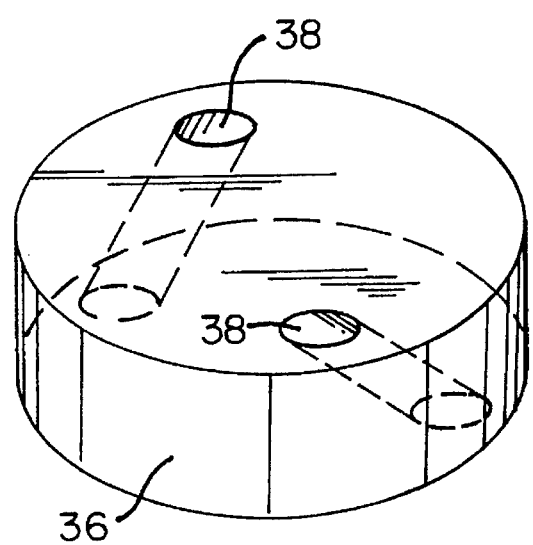
FIG. 5 is a perspective view of a third embodiment of the flow directing means of the assembly according to this invention.

FIG. 5 illustrates a third embodiment for a flow director which comprises a generally planar plate 36 supported with its plane orthogonal to the central axis of the tube 10 and having at least one orifice 38 therethrough at an acute angle to the central axis of the tube 10.

As illustrated, the direction of fluid flow is upward. Accordingly, the flow directer is below the sight tube 10. The flow directer must be upstream of the support member 12, 20 and the cleaning members 18, and preferably closely adjacent the cleaning members 18. Therefore, if the flow through the sight tube 10 is in the downward direction, the flow director would be installed between the member 16 and the support member 12, 20. The flow director would then have a central aperture through which the shaft 14 would extend, for the embodiments shown in FIGS. 3A, 3B and 5, or would curve around the shaft 14, for the embodiment shown in FIGS. 4A, 4B and 4C.

The area cleaned by each link of the chains 18 moves axially as the flow rate changes. Therefore, with varying flow rates, substantially the entire interior surface of the sight tube 10 will be cleaned.

Accordingly, there has been disclosed an improved self-cleaning assembly for a sight tube interposed in a fluid flow line. While illustrative embodiments of the present invention have been disclosed herein, it is understood that various modifications and adaptations to the disclosed embodiments will be apparent to those of ordinary skill in the art and it is intended that this invention be limited only by the scope of the appended claims.

What is claimed is:

1. A self-cleaning sight tube assembly interposed in a fluid flow line and comprising:

a cylindrical transparent sight tube arranged to provide fluid flow therethrough, said tube being disposed with its central axis in a generally vertical orientation;

a support member;

a plurality of elongated cleaning members;

securing means for securing said plurality of cleaning members to said support member so that said plurality of cleaning members are substantially parallel to each other and extend in the same direction away from said support member;

support means for supporting said support member for free rotation about said tube central axis, said support means being so located that said plurality of cleaning members are suspended downwardly from said support member within said tube; and flow directing means for causing said fluid to flow in a spiral pattern within said tube;

whereby the spiral pattern flow through said tube causes said plurality of cleaning members and said support member to rotate about the tube central axis with the resulting centrifugal force on said plurality of cleaning members causing said plurality of cleaning members to engage the interior surface of said tube and effect a scouring action thereon.

2. The assembly according to claim 1 wherein:

said support member comprises a generally planar circular disc having a diameter less than the diameter of said tube;

said support means supports said disc from its center with the plane of said-disc being orthogonal to said tube central axis; and said securing means secures each of said plurality of cleaning members to said disc at respective locations thereon which are equidistant from the center of said disc and equiangularly spaced thereabout.

3. The assembly according to claim 1 wherein:

there are two cleaning members;

said support member comprises an elongated bar having a length less than the diameter of said tube;

said support means supports said bar from its center with said bar being orthogonal to said tube central axis; and said securing means secures each of said two cleaning members to a respective end of said bar.

4. The assembly according to claim 1 wherein each of said cleaning members comprises a length of chain.

5. The assembly according to claim 4 wherein said chain is formed of stainless steel links.

6. The assembly according to claim 1 wherein said flow directing means is interposed in said flow line upstream of said pair of cleaning members.

7. The assembly according to claim 6 wherein said flow directing means comprises at least one radial vane at an acute angle to said tube central axis.

8. The assembly according to claim 7 wherein the vane angle is approximately 45°.

9. The assembly according to claim 6 wherein said flow directing means comprises a generally planar plate supported with its plane orthogonal to the tube axis and having at least one orifice therethrough at an acute angle to the tube central axis.

10. An assembly for scouring the interior wall of a vertically oriented cylindrical tube interposed in a fluid flow line, the assembly comprising:

a scouring member vertically suspended within said tube for rotation about the central axis of said tube; and means responsive to fluid flow in said line for rotating said scouring member about the central axis of said tube so that centrifugal force causes said scouring member to be moved outwardly into scouring engagement with the interior wall of said tube.

11. The assembly according to claim 10 further including:

a generally planar circular disc;

means for supporting said disc in a generally horizontal plane for rotation about the central axis of the tube; and means for securing said scouring member to said disc remote from the central axis of said tube.

12. The assembly according to claim 11 wherein said disc is supported at its center and there are a plurality of scouring members each secured at the periphery of said disc at equiangularly spaced locations thereon.

13. The assembly according to claim 10 further including:

an elongated bar;

means for supporting said bar generally horizontally for rotation about the central axis of said tube; and means for securing said scouring member to said bar remote from the central axis of said tube.

14. The assembly according to claim 13 wherein said bar is supported at its center and there are two scouring members each secured to an opposite end of said bar.

15. The assembly according to claim 10 wherein said scouring member includes a length of chain.

16. The assembly according to claim 15 wherein said chain is formed of stainless steel links.

17. The assembly according to claim 10 wherein said means for rotating said scouring member includes flow directing means for causing said fluid to flow in a spiral pattern within said tube.

18. The assembly according to claim 17 wherein said flow directing means includes a plurality of radially extending vanes each at an acute angle to the central axis of said tube and interposed in said flow line upstream of said scouring member.

19. The assembly according to claim 17 wherein said flow directing means comprises a generally planar plate supported upstream of said scouring member with its plane orthogonal to the tube central axis and having at least one orifice therethrough at an acute angle to the tube central axis.

* * * * *